(12) United States Patent
Zollinger et al.

(10) Patent No.: US 6,997,012 B2
(45) Date of Patent: *Feb. 14, 2006

(54) METHOD OF LIQUIFYING A GAS

(75) Inventors: William T. Zollinger, Idaho Falls, ID (US); Dennis N. Bingham, Idaho Falls, ID (US); Michael G. McKellar, Idaho Falls, ID (US); Bruce M. Wilding, Idaho Falls, ID (US); Kerry M. Klingler, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 104 days.

This patent is subject to a terminal disclaimer.

(21) Appl. No.: 10/752,653

(22) Filed: Jan. 6, 2004

(65) Prior Publication Data

US 2005/0144979 A1 Jul. 7, 2005

(51) Int. Cl.
*F25J 1/00* (2006.01)
(52) U.S. Cl. .......................................... 62/606; 62/607
(58) Field of Classification Search ................ 62/606, 62/607
See application file for complete search history.

(56) References Cited

U.S. PATENT DOCUMENTS

| | | | |
|---|---|---|---|
| 3,504,494 A | | 4/1970 | Winsohe |
| 3,608,323 A | * | 9/1971 | Salama ........................ 62/613 |
| 3,735,601 A | * | 5/1973 | Stannard, Jr. .................. 62/87 |
| 3,943,719 A | | 3/1976 | Terry et al. |
| 4,593,534 A | | 6/1986 | Bloomfield |
| 4,671,080 A | | 6/1987 | Gross |
| 5,161,382 A | | 11/1992 | Missimer |
| 5,363,655 A | | 11/1994 | Kikkawa et al. |
| 5,615,561 A | | 4/1997 | Houshmand et al. |
| 5,806,316 A | * | 9/1998 | Avakov et al. ............... 60/649 |
| 5,867,978 A | * | 2/1999 | Klanchar et al. ......... 60/39.182 |
| 5,916,260 A | * | 6/1999 | Dubar ......................... 62/613 |
| 5,997,821 A | | 12/1999 | Joshi |
| 6,412,302 B1 | | 7/2002 | Foglietta |
| 6,581,409 B1 | | 6/2003 | Wilding et al. |
| 2005/0079130 A1 | * | 4/2005 | Bingham et al. ........ 423/658.2 |

* cited by examiner

*Primary Examiner*—William C. Doerrler
(74) *Attorney, Agent, or Firm*—Wells St. John P.S.

(57) ABSTRACT

A method of liquefying a gas is disclosed and which includes the steps of pressurizing a liquid; mixing a reactant composition with the pressurized liquid to generate a high pressure gas; supplying the high pressure gas to an expansion engine which produces a gas having a reduced pressure and temperature, and which further generates a power and/or work output; coupling the expansion engine in fluid flowing relation relative to a refrigeration assembly, and wherein the gas having the reduced temperature is provided to the refrigeration assembly; and energizing and/or actuating the refrigeration assembly, at least in part, by supplying the power and/or work output generated by the expansion engine to the refrigeration assembly, the refrigeration assembly further reducing the temperature of the gas to liquefy same.

22 Claims, 3 Drawing Sheets

METHOD OF LIQUIFYING A GAS

GOVERNMENT RIGHTS

The United States Government has certain rights in this invention pursuant to Contract No. DE-AC07-99ID 13727, and Contract No. DE-AC07-05ID 14517 between the United States Department of Energy and Battelle Energy Alliance, LLC.

TECHNICAL FIELD

The present invention relates to a method of liquifying a gas, and more specifically to a method for generating hydrogen gas at high pressure and then later cooling the high pressure hydrogen gas to liquify same.

BACKGROUND OF THE INVENTION

The prior art is replete with numerous examples of references which discuss, in great detail, the advantages of utilizing hydrogen gas to replace fossil fuels in the production of energy, either by means of electrochemical devices such as fuel cells, or which further can be consumed in the internal combustion engines of various overland vehicles.

While the advantages of using fuels, such as hydrogen, to replace fossil fuel as a primary energy source are many, no single approach has emerged which will provide a convenient means whereby hydrogen can be economically liquified thereby rendering it more useful in the applications noted above. As a general matter, the current methods of producing liquid hydrogen have been viewed, by most investigators, as being expensive and very energy intensive. Consequently, hydrogen has not currently been embraced as a substitute fuel to replace the various hydrocarbon based fuels which are widely used in the marketplace.

In addition to the foregoing shortcomings, another impediment to the widespread adoption and use of hydrogen as an alternative or replacement fuel to various widely used hydrocarbon fuels relates to the lack of a hydrogen infrastructure which would permit a hydrogen fuel to be distributed at widely diverse geographical locations.

A method of liquifying a gas which addresses these and other perceived shortcomings in the prior art teachings and practices is the subject matter of the present application.

SUMMARY OF THE INVENTION

One aspect of the present invention is to provide a method of liquefying a gas, which includes pressurizing a liquid; mixing a reactant composition with the pressurized liquid to generate a high pressure gas; supplying the high pressure gas to an expansion engine which produces a gas having a reduced pressure and temperature, and which further generates a power output; coupling the expansion engine in fluid flowing relation relative to a refrigeration assembly, and wherein the gas having the reduced temperature is provided to the refrigeration assembly; and energizing the refrigeration assembly, at least in part, by supplying the power output generated by the expansion engine to the refrigeration assembly, the refrigeration assembly further reducing the temperature of the gas to liquefy same.

Another aspect of the present invention relates to a method of liquefying a gas which includes, providing a container; supplying a liquid to the container; coupling a charging pump in fluid flowing relation relative to the container to increase the pressure of the liquid within the container; providing a reactant compound and supplying the reactant compound to the liquid which is under pressure in the container, and wherein the reactant compound chemically reacts with the liquid to generate a high pressure gas; providing an expansion engine, and coupling the expansion engine in fluid receiving relation relative to the container to receive the high pressure gas, and wherein the expansion engine, upon receiving the high pressure gas, provides a resulting power output, and further provides a gas output having a reduced temperature and pressure; providing a refrigeration assembly, and coupling the expansion engine in fluid flowing relation relative to the refrigeration assembly, and wherein the gas output having the reduced temperature and pressure is supplied to the refrigeration assembly; and supplying the power output generated by the expansion engine to energize the refrigeration assembly, and wherein the refrigeration assembly, when energized, liquefies the gas having the reduced temperature and pressure, and which is delivered from the expansion engine.

Yet still another aspect of the present invention relates to a method of liquefying a gas which includes, providing a container having a volume; providing a source of water; providing a charging pump coupled in fluid flowing relation relative to the source of water, and with container, the charging pump supplying the source of water to the container and filling the volume thereof to a pressure of greater than about 150 pounds per square inch; providing a source of a chemical hydride; metering the source of the chemical hydride to the container, and wherein the source of chemical hydride chemically reacts with the water, under pressure, to produce a high pressure hydrogen gas which is enclosed within the container; providing an expansion engine and supplying the high pressure hydrogen gas enclosed within the container to the expansion engine, and wherein the expansion engine is operable to generate a power output while simultaneously reducing the pressure and the temperature of the hydrogen gas supplied by the container; providing a refrigeration assembly and supplying the hydrogen gas having a reduced temperature and pressure to the refrigeration assembly; supplying the power output generated by the expansion engine to the refrigeration assembly to energize the refrigeration assembly, and wherein the refrigeration assembly, when energized, reduces the temperature of the hydrogen gas so that it passes from a gaseous phase to a liquid phase; and supplying the liquid hydrogen to a container for storage.

These and other aspects of the present invention will be discussed in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
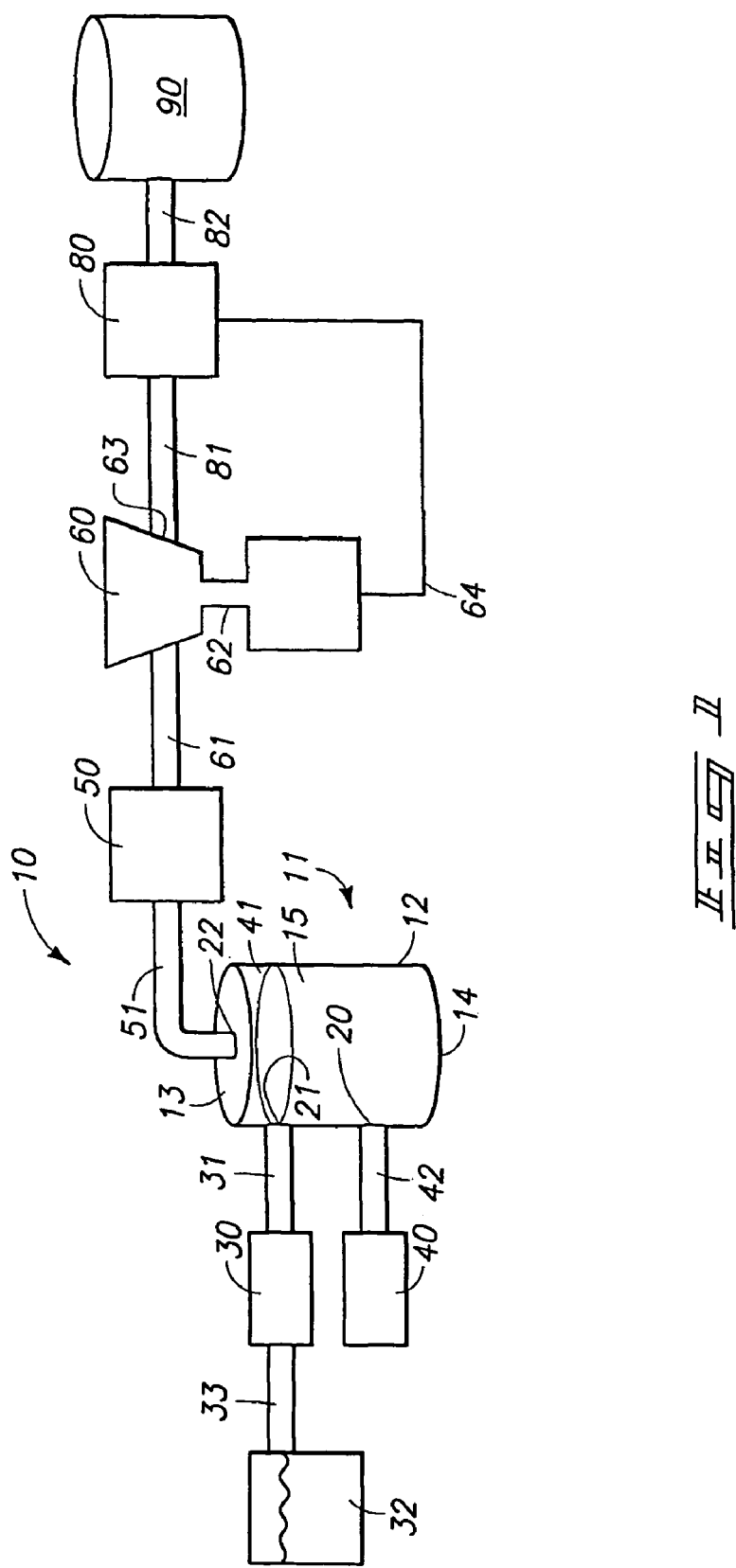
FIG. 1 is a greatly simplified schematic drawing illustrating an arrangement of practicing the present method.

A first described arrangement which is useful in practicing the methodology of the present invention is shown in FIG. 1. As seen therein, the methodology includes providing a container which is generally indicated by the numeral 11. The container 11 is defined by a sidewall 12, and further includes a top surface 13, and a bottom surface 14 which are attached to the sidewall and which define an internal cavity 15. First, second and third passageways or apertures 20, 21 and 22 are formed through the sidewall 12 and couple the internal cavity 15 in fluid flowing relation relative to other assemblies which will be discussed hereinafter.

The method of producing a high pressure gas 10 of the present invention includes a step of supplying the container 11 with a liquid, and increasing the pressure of the liquid within the container. In this regard, and referring to FIG. 1, a charging pump 30 is provided and is coupled to the second passageway 21 by way of a conduit or other fluid passageway 31. The charging pump 30 is coupled in fluid flowing relation relative to a source of a liquid 32 by way of a conduit or fluid passageway which is generally indicated by the numeral 33. The charging pump supplies the fluid to the container and increases the liquid pressure within the container 11 to greater than about 150 pounds per square inch. The liquid may include a substantially homogenous solution such as water, or a solution including two or more compositions, including catalysts which would facilitate the production or generation of the high pressure gas.

As seen in FIG. 1, the method of producing a high pressure gas 10 of the present invention further includes the step of supplying a reactant composition 40 which may include a metal or metal hydride to the liquid 32 which is under pressure within the container 11. The reactant composition 40 chemically reacts with the liquid 32 to produce a resulting high pressure gas 41.

The source of the reactant composition 40 is coupled in fluid communication with container 11 by way of a passageway or conduit 42 which allows the movement of the reactant composition into the cavity 15. For purposes of the present application, the high pressure gas 41 will be described hereinafter as high pressure hydrogen gas. It should be understood that the present teachings are not limited to the production of hydrogen gas, but may be applied to other useful gasses. A hydrogen dryer 50 is provided, and a conduit or other fluid passageway 51 couples the third passageway 22 in fluid flowing relation relative to the hydrogen dryer. The hydrogen dryer 50 is operable to remove any undesirable gaseous fluids such as water vapor which is mixed with the released high pressure hydrogen gas 41. The hydrogen dryer is coupled in fluid flowing relation relative to a storage container 60 by way of a fluid passageway which is generally indicated by the numeral 61. The storage container for the high pressure hydrogen gas 41 may take on various forms including single or multiple containers and may further be integrated with other processes. It should also be understood in certain arrangements, a hydrogen dryer may not be required. For example, if the high pressure hydrogen gas 41 will be later supplied to an assembly such as a proton exchange membrane fuel cell, it may be actually advantageous to have a gaseous liquid, such as water vapor, supplied with same. Such gaseous liquids such as water vapor would actually encourage the production of electricity in various proton exchange membrane fuel cell arrangements.

Figure 2:
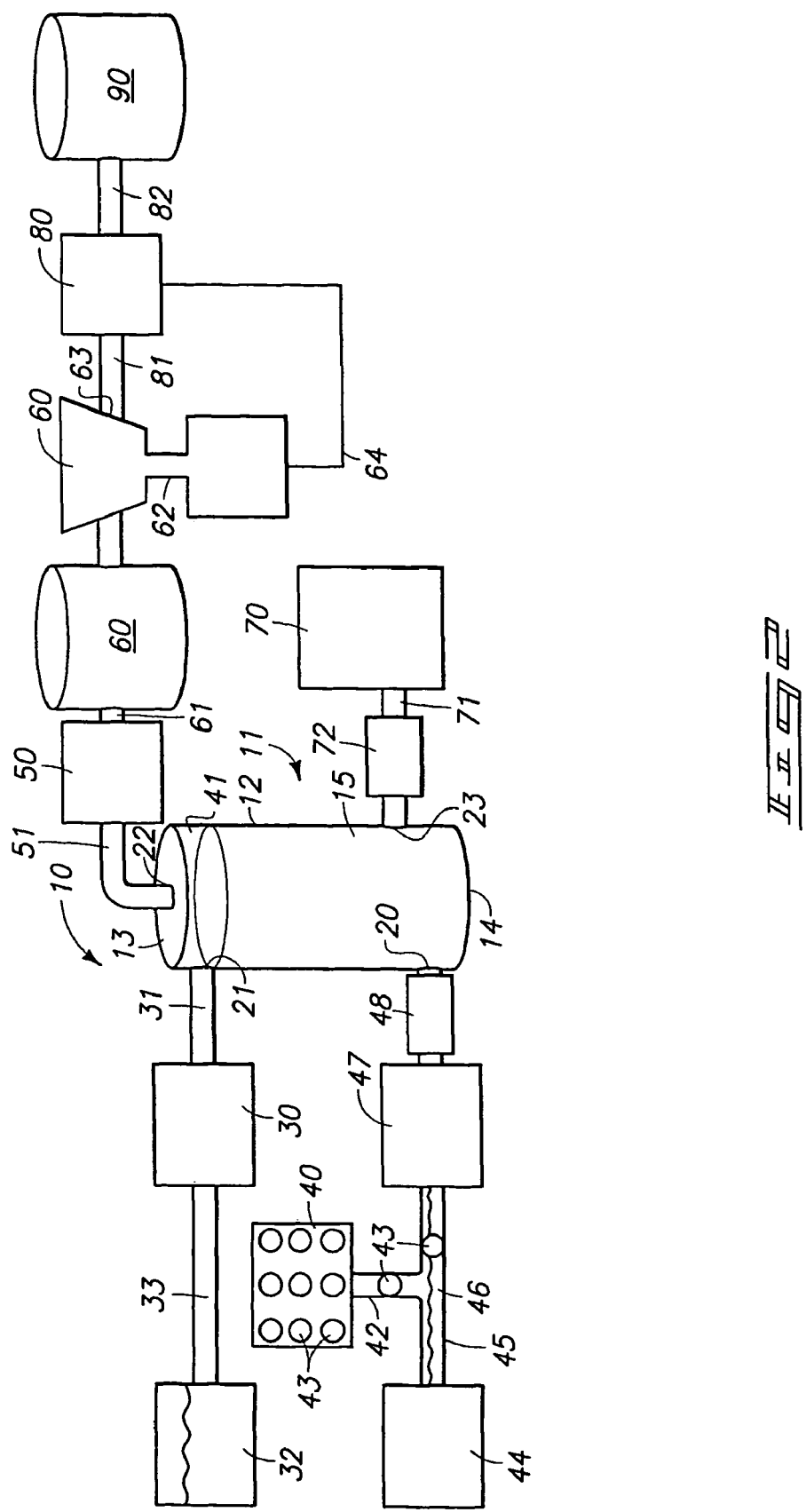
FIG. 2 is a greatly simplified schematic drawing illustrating a second arrangement of practicing the present method.

Referring now to FIG. 2, a greatly simplified view of a second arrangement for practicing the method of the present invention 10 is shown. To the extent that like assemblies are described, similar numbers will be utilized. The method for producing a high pressure gas 10 includes providing a container 11 which is operable to enclose a fluid 32 under pressure. Similar to that described with FIG. 1, the container has a sidewall 12, and top and bottom surfaces 13 and 14 which are joined together to form a cavity 15. First, second, third and fourth passageways 20, 21, 22 and 23 are formed through the sidewall 12 and couple the cavity 15 in fluid flowing relation relative to other assemblies which will be described hereinafter. As was the case with FIG. 1, a charging pump 30 is provided and is coupled, by way of a fluid passageway 31 to the cavity 15. Still further, the method comprises supplying a source of a fluid 32 to the cavity 15 and increasing the pressure of the fluid enclosed within the container 11 by means of the charging pump 30. In the arrangement as shown in FIG. 2, the method further includes rendering a reactant composition 40 substantially chemically non-reactive, as will be described below. The supply of the reactant compound 40 performs in a manner similar to that described in FIG. 1, that is when the reactant compound is combined with the liquid 32 which has been pumped to high pressure within the container 11, it produces a high pressure hydrogen gas 41. The supply of the reactant compound 40 which is substantially chemically non-reactive includes a step of enclosing the reactant composition 40 in a frangible substantially chemically non-reactive enclosure 43. The usefulness of compositions within these types of enclosures are discussed in greater detail in U.S. Pat. Nos. 5,728,464 and 5,817,157, the teachings of which are incorporated herein. Therefore the supply of the reactant composition 40 includes a plurality of these frangible containers 43. As further seen in FIG. 2, a second source of a fluid 44 is provided, and a fluid passageway or conduit 45 couples the second source of fluid 44 in fluid flowing relation relative to the first passageway 20. The fluid passageway 45 provides a course of travel for the fluid stream 46, which is also coupled in fluid flowing relation relative to the conduit or fluid passageway 42. As illustrated, the frangible containers 43 are operable to move along the conduit or passageway 42 and travel along with the fluid stream 46 which is produced from the second source of fluid 44. The fluid passageway 45 is coupled in fluid flowing relation relative to a valve assembly 47. The valve assembly is operable to selectively remove a portion of the fluid stream 46 which contains some of the frangible containers 43 from the remaining fluid stream, and deliver the isolated portion of the fluid stream along with some of the frangible containers 43 to the cavity 15 of the container 11. A valve assembly 47 is coupled in fluid flowing relation relative to an assembly 48 which is operable to fracture or otherwise split open the frangible containers 43 thereby releasing the reactant composition 40 which may include a metal or metal hydride to the source of liquid 32 which has been placed under pressure by the charging pump 30. The release of this reactant compound 40 causes a chemical reaction which produces the high pressure hydrogen gas 41 which was discussed above. Similar to that earlier discussed with respect to FIG. 1, the assembly shown in FIG. 2 includes a hydrogen dryer 50 for removing gaseous water vapor which may be mixed with the hydrogen gas 41 and a storage container 60 for receiving and storing the high pressure hydrogen gas 41 which is generated as a result of this methodology. FIG. 2 further illustrates a by-product container which is generally indicated by the numeral 70, and which is coupled by way of a fluid conduit or passageway 71 to the container 11. A valve assembly 72 is provided, and is disposed in fluid metering relation along the fluid conduit 71. The by-product container 70 is operable to selectively receive the resulting by-products produced as a result of chemical reaction when the valve assembly 72 is operated. For example, in the instance where, sodium hydride, or sodium borohydride are employed as the reactant compound 40, the by-product container 70 would be operable to receive the by-products of a chemical reaction which may include sodium hydroxide or sodium borate. The by-products may also include the remains of the frangible containers 43 which have been fractured by the assembly 48.

Figure 3:
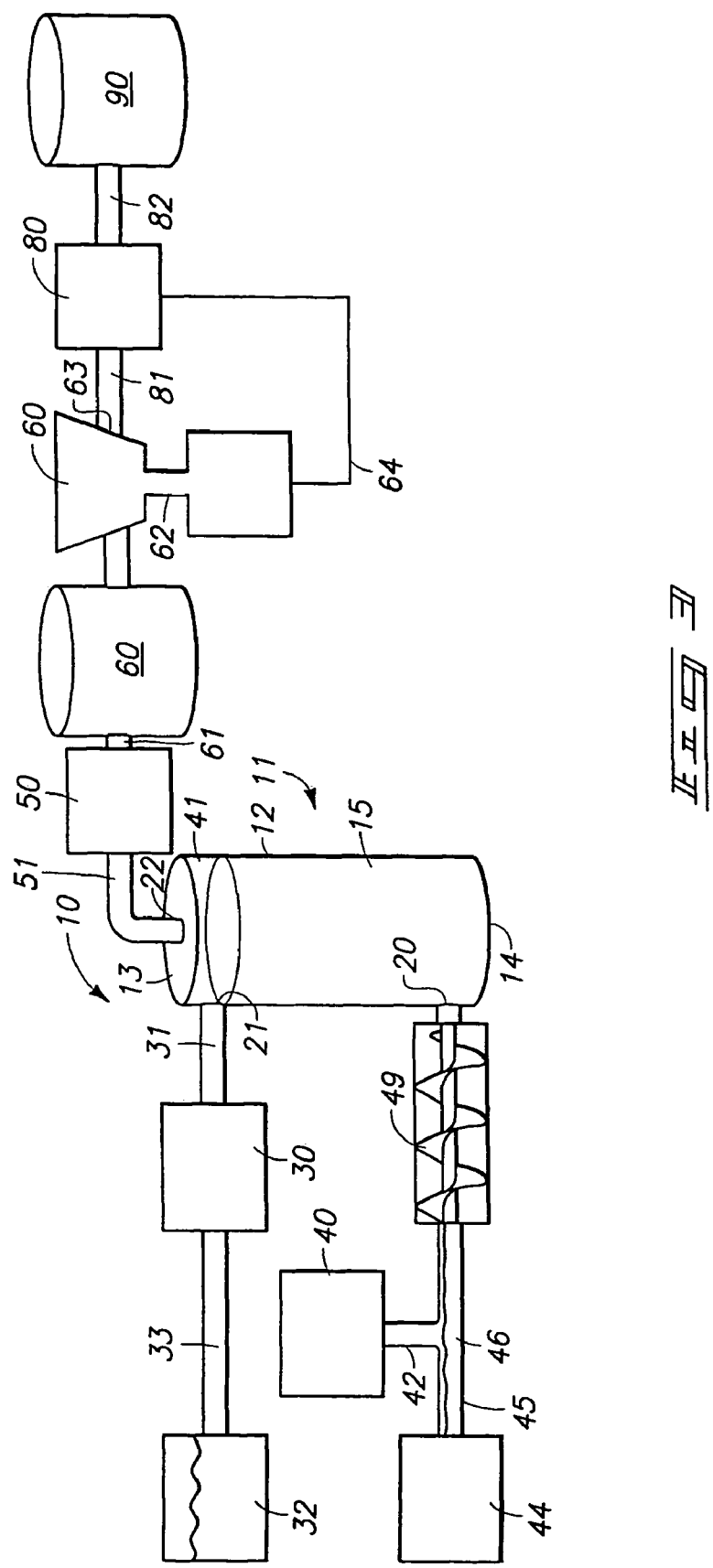
FIG. 3 is a greatly simplified schematic drawing illustrating a third arrangement of practicing the present method.

Referring now to FIG. 3, a greatly simplified view of a third arrangement which can be utilized to practice the method of the present invention is shown. FIG. 3 shows many of the features of FIGS. 1 and 2. As was discussed with respect to FIG. 2, similar numbers indicate similar assemblies. As seen in FIG. 3, a container 11 defining a cavity 15 for enclosing a liquid 32 which has been placed under pressure by a charging pump 30 is provided. In FIG. 3 it will also be seen that a source of reactant compound 40 (such as a metal or metal hydride) is provided and is coupled by way of a conduit 42 in dispensing relation relative to a fluid passageway 45 similar to that shown in FIG. 2. A second source of a fluid 44 is shown coupled in fluid flowing relation relative to the passageway 45, the source of the second fluid is substantially inert and forms the fluid stream 46 which is subsequently mixed with the source of the reactant compound 40 which is supplied by way of the passageway 42 to the passageway 45. The mixture of the inert fluid 44, and the reactant compound 40 is supplied to an assembly 49, here illustrated as a continuous screw or auger, and which is operable to supply the mixture of the inert fluid 44 and the reactant compound 42 to the chamber 15. Once the reactant compound and the inert fluid is received in the chamber 15, the reactant compound 40 chemically reacts with the fluid 32 in order to produce the high pressure hydrogen gas 41. Similar to that shown with FIGS. 1 and 2, the high pressure hydrogen gas is subsequently supplied to a hydrogen dryer 50 by way of a conduit 51, and then is provided to a storage container 60. As was discussed with FIG. 1, the hydrogen dryer may be omitted under certain circumstances.

Referring now to FIGS. 1, 2 and 3, the method of liquifying a gas 10 of the present invention, as earlier discussed includes the steps of pressurizing a liquid 32 within the container 11 and mixing a reactant composition 40 (which may comprise a metal or metal hydride) with the pressurized liquid to generate a high pressure gas 41 which may have a preponderance of hydrogen. As seen in FIGS. 1, 2 and 3, the high pressure gas 41, following treatment by the hydrogen dryer 50, is delivered to an expansion engine which is indicated by the numeral 60. The expansion engine is coupled in fluid flowing relation relative to the hydrogen dryer 50 by way of the conduit or fluid passageway 61. Expansion engines are well known in the art and include internal turbines (not shown) and which when exposed to the flow of high pressure hydrogen gas 41, produces a first mechanical output 62, and a second gas output 63 having a reduced pressure and temperature. The mechanical output of the expansion engine is converted into various power or work outputs which may include, but are not limited to, mechanical, electrical, hydraulic or others and which are transmitted by way of a transmission pathway or other force or work transmission means 64 to a refrigeration assembly which is generally indicated by the numeral 80. The refrigeration assembly 80 is of conventional design, and is coupled in fluid flowing relation relative to the gas output 63 of the expansion engine 60 and by way of a fluid conduit or passageway 81. The refrigeration assembly 80 is coupled, by way of the transmission pathway or other force or work transmission means 64, to the expansion engine 60. The expansion engine is operable to generate, at least in part, the power or work output necessary to energize or actuate the refrigeration assembly 80. The gas output 63 of the expansion engine 60, once received by the refrigeration assembly 80, is further reduced in temperature thereby liquifying same. The liquified gas 41 now moves on to a storage container 90 by way of a fluid passageway 82 which couples the storage container 90, and the refrigeration assembly 80, in fluid flowing relation one relative to the other.

In the method 10 as described above, the step of pressurizing the liquid 32 includes pressurizing the liquid to a pressure which causes the resulting high pressure gas 41 to have a pressure of at least about 150 pounds per square inch. Still further, the step of supplying the high pressure gas 41 to the expansion engine 80 comprises providing a gas output 63 having a reduced temperature of less than about 50 degrees C., and a pressure greater than about 1 ATM or ambient. In the embodiments as shown in FIGS. 1, 2 and 3, and which are useful in practicing the method of the present invention, the expansion engine 60 may comprise a turbo-expander which is coupled in fluid receiving relation relative to the high pressure gas 42. In this arrangement, the turbo-expander generates a power output which is transmitted by way of the transmission pathway or other force or work transmission means 64 and which provides a preponderance of the power or other work needed by the refrigeration assembly 80 to liquefy the gas 41. The liquified gas is delivered to the storage container 90 and may be utilized for a number of different purposes including being utilized as a fuel. In the step of providing the expansion engine 60, and coupling it in fluid flowing relation relative to the hydrogen dryer 50, and the source of high pressure gas 41 which is generated by the container 11, the expansion engine 60 is operable to reduce the temperature of the high pressure gas to at least about –200 degrees F., and further reduce the pressure of the gas to less than about 150 pounds per square inch.

Operation

The operation of the described embodiments of the present invention are believed to be readily apparent and are briefly summarized at this point.

A method of liquefying a gas 10 of the present invention includes the steps of providing a container 11 and supplying a liquid 32 to the container. Still further, the method comprises coupling a charging pump 30 in fluid flowing relation relative to the container 11 to increase the pressure of the liquid within the container. Still further, the method comprises providing a reactant compound 40 such as a metal or metal hydride and supplying the reactant compound 40 to the liquid 30 which is under pressure in the container. One example of an acceptable liquid is water, and an acceptable metal hydride is sodium borohydride or sodium hydride. The reactant compound 40 upon being received in the container 11, chemically reacts with the liquid 32 to generate a high pressure gas 41. If a chemical hydride such as sodium borohydride is supplied, the resulting high pressure gas 41 comprises hydrogen. An expansion engine 60 is provided and is coupled in fluid flowing relation relative to the container 11 by way of a conduit 61 and is operable to receive the high pressure gas 41. The expansion engine 60, upon receiving the high pressure gas, provides a resulting power or work output which is supplied to a refrigeration assembly 80, and also produces a gas output 63 having a reduced temperature and pressure. As earlier disclosed, the expansion engine is coupled in fluid flowing relation relative to the refrigeration assembly 80. The gas having reduced temperature and pressure provided by the expansion engine 60, is supplied to the refrigeration assembly for further cooling. The power or work output provided by the expansion engine is supplied by the expansion engine to energize and/or actuate, at least in part, the refrigeration assembly. The refrigeration assembly 80, when energized and/or actuated, liquifies the gas having reduced temperature and pressure and which is delivered from the expansion engine 60. As earlier disclosed, the reactant compound 40 may comprise metals or metal hydrides and the gas which is liquified comprises liquid hydrogen which is held in the storage container 90. The liquified hydrogen may be used as a fuel for various devices such as fuel cells and internal combustion engines.

Therefore, the present method of liquifying a gas provides a convenient means for both generating a high pressure gas such as hydrogen and then liquifying same. The present method also provides a convenient solution to the acknowledged problem of a hydrogen infrastructure which would permit hydrogen to be generated in an acceptable form at remote geographical locations and which would be suitable as a fuel.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I/We claim:

1. A method of liquefying a gas, comprising:
   pressurizing a liquid;
   after pressurizing the liquid;
   mixing a reactant composition with the pressurized liquid to generate a high pressure gas;
   supplying the high pressure gas to an expansion engine which produces a gas having a reduced pressure and temperature, and which further generates a power and/or work output;
   coupling the expansion engine in fluid flowing relation relative to a refrigeration assembly, and wherein the gas having the reduced temperature is provided to the refrigeration assembly; and
   energizing the refrigeration assembly, at least in part, by supplying the power and/or work output generated by the expansion engine to the refrigeration assembly, the refrigeration assembly further reducing the temperature of the gas to liquefy the gas.

2. A method as claimed in claim 1, and wherein pressurizing a liquid further comprises:
   providing a source of a liquid;
   providing a container which is coupled in fluid flowing relation relative to the expansion engine and which receives the source of the liquid; and
   providing a charging pump which is coupled in fluid flowing relation relative to the container and which pressurizes the liquid which is enclosed by the container.

3. A method as claimed in claim 1, and wherein mixing a reactant composition with the pressurized liquid further comprises:
   enclosing the reactant composition in a plurality of individual frangible containers; and
   supplying and then fracturing the individual frangible containers which are provided to the pressurized liquid to expose the reactant composition to the liquid.

4. A method as claimed in claim 1, and wherein mixing a reactant composition with the pressurized liquid further comprises:
   mixing the reactant composition with an inert fluid carrier; and
   mixing the reactant composition and inert fluid carrier with the pressurized liquid.

5. A method as claimed in claim 1, and wherein pressurizing a liquid further comprises:
   providing a source of water, and wherein the step of supplying a reactant compound further comprises providing a source of chemical hydride which chemically reacts with the water to generate hydrogen gas.

6. A method as claimed in claim 1, and wherein pressurizing the liquid further comprises pressurizing the liquid to at least about 150 pounds per square inch.

7. A method as claimed in claim 1, and wherein pressurizing the liquid further comprises pressurizing the liquid to a pressure which causes the resulting high pressure gas to have a pressure of at least about 150 pounds per square inch.

8. A method as claimed in claim 7, and wherein supplying the high pressure gas to the expansion engine further comprises producing a gas having a reduced temperature of less that about 50 degrees C., and a pressure greater than about 1 ATM or ambient.

9. A method as claimed in claim 1, and wherein supplying the high pressure gas to the expansion engine further comprises providing a turbo-expander which is coupled in fluid receiving relation relative to the high pressure gas, and wherein the turbo-expander generates a power and/or work output which provides a preponderance of the power need by the refrigeration assembly to liquefy the gas.

10. A method as claimed in claim 1, and wherein after energizing the refrigeration assembly, the method further comprises:
    delivering the liquefied gas to a container, and wherein the liquefied gas is utilized as fuel.

11. A method of liquefying a gas, comprising;
    providing a container;
    supplying a liquid to the container;
    coupling a charging pump in fluid flowing relation relative to the container to increase the pressure of the liquid within the container;
    after the steps of supplying a liquid to the container, and increasing the pressure of the liquid within the container:
    providing a reactant compound and supplying the reactant compound to the liquid which is under pressure in the container, and wherein the reactant compound chemically reacts with the liquid to generate a high pressure gas;
    providing an expansion engine and coupling the expansion engine in fluid receiving relation relative to the container to receive the high pressure gas, and wherein the expansion engine, upon receiving the high pressure gas, provides a resulting power and/or work output, and further provides a gas having a reduced temperature and pressure;
    providing a refrigeration assembly, and coupling the expansion engine in fluid flowing relation relative to the refrigeration assembly, and wherein the gas having the reduced temperature and pressure is supplied to the refrigeration assembly; and supplying the power and/or work output generated by the expansion engine to energize and/or actuate the refrigeration assembly, and wherein the refrigeration assembly, when energized, liquefies the gas having the reduced temperature and pressure and which is delivered from the expansion engine.

12. A method as claimed in claim 11, and wherein supplying liquid to the container further comprises:

supplying a source of water which chemically reacts with the reactant compound to produce the high pressure gas.

13. A method as claimed in claim 11, and wherein providing a reactant compound and supplying the reactant compound to the liquid further comprises:

providing an assembly for selectively metering the reactant compound to the container.

14. A method as claimed in claim 11, and wherein providing the reactant compound further comprises providing a supply of a chemical hydride which chemically reacts with the liquid under pressure to produce a high pressure hydrogen gas.

15. A method as claimed in claim 14, and wherein providing a supply of the chemical hydride further comprises:

enclosing the chemical hydride in a plurality frangible enclosures;

metering the respective frangible enclosures to the container; and fracturing the respective enclosures so as to expose the chemical hydride to the liquid in the container.

16. A method as claimed in claim 11, and wherein providing the reactant compound further comprises providing a supply of chemical hydride which chemically reacts with the liquid, under pressure, to produce hydrogen gas having a pressure of at least about 150 pounds per square inch and a temperature of less than about 50 degrees C.

17. A method as claimed in claim 16, and wherein providing the expansion engine and coupling the expansion engine in fluid receiving relation relative to the container further comprises reducing the temperature of the gas to at least about −200 degrees F, and reducing the pressure of the gas to less than about 150 pounds per square inch.

18. A method as claimed in claim 11, and wherein the power and/or work output of the expansion engine supplies a preponderance of the power to energize and/or actuate the refrigeration assembly.

19. A method of liquefying a gas, comprising:

providing a container having a volume;

providing a source of water;

providing a charging pump coupled in fluid flowing relation relative to the source of water and with container, the charging pump first, supplying the source of water to the container, and secondly filling the volume thereof to a pressure of greater than about 150 pounds per square inch;

providing a source of a chemical hydride;

after supplying the source of water to the container and filling the volume thereof to a pressure of greater than about 150 pounds per square inch, metering the source of the chemical hydride to the container, and wherein the source of chemical hydride chemically reacts with the water under pressure to produce a high pressure hydrogen gas which is enclosed within the container;

providing an expansion engine and supplying the high pressure hydrogen gas enclosed within the container to the expansion engine, and wherein the expansion engine is operable to generate a power and/or work output while simultaneously reducing the pressure and the temperature of the hydrogen gas supplied by the container;

providing a refrigeration assembly and supplying the hydrogen gas having a reduced temperature and pressure to the refrigeration assembly;

supplying the power and/or work output generated by the expansion engine to the refrigeration assembly to energize and/or actuate the refrigeration assembly, and wherein the refrigeration assembly, when energized, reduces the temperature of the hydrogen gas so that it passes from a gaseous phase to a liquid phase; and supplying the liquid hydrogen to a container for storage.

20. A method as claimed in claim 19, and wherein metering the source of chemical hydride further comprises producing a hydrogen gas having a pressure of at least about 150 pounds per square inch, and a temperature of less than about 50 degrees C.

21. A method as claimed in claim 19, and wherein metering the source of chemical hydride further comprises:

enclosing the source of chemical hydride in a plurality of frangible enclosures; and fracturing the respective enclosures so as to expose the chemical hydride to the water enclosed within the container.

22. A method for liquefying a gas, comprising:

providing a container defining a cavity;

supplying a fluid to the cavity of the container;

after supplying the fluid to the cavity, increasing the pressure of the fluid within the cavity;

after increasing the pressure of the fluid within the cavity, delivering a reactant composition to the cavity of the container and mixing the reactant composition with the fluid within the cavity to generate a resulting high pressure gas;

providing an expansion engine, and supplying the resulting high pressure gas to the expansion engine, and wherein the expansion engine provides a gas output having reduced pressure and temperature and which further generates a power and/or work output;

coupling the expansion engine in fluid flowing relation relative to a refrigeration assembly, and supplying the gas output of the expansion engine to the refrigeration assembly so as to be reduced in temperature; and energizing the refrigeration assembly, at least in part, by supplying the power and/or work output of the expansion engine to the refrigeration assembly, and wherein the refrigeration assembly liquefies the gas output of the expansion engine.

* * * * *